US008869203B2

(12) United States Patent
Marshall et al.

(10) Patent No.: US 8,869,203 B2
(45) Date of Patent: Oct. 21, 2014

(54) MULTIMEDIA CONTENT FUSION

(75) Inventors: Veloris Sonny Marshall, Herndon, VA (US); Paul Dardinski, Frederick, MD (US); Keith Dyson, Manassas, VA (US)

(73) Assignee: Marshall Communications, Ashburn, VA (US)

( * ) Notice: Subject to any disclaimer, the term of this patent is extended or adjusted under 35 U.S.C. 154(b) by 49 days.

(21) Appl. No.: 12/899,970

(22) Filed: Oct. 7, 2010

(65) Prior Publication Data

US 2011/0119711 A1 May 19, 2011

Related U.S. Application Data

(60) Provisional application No. 61/272,584, filed on Oct. 8, 2009.

(51) Int. Cl.
| | |
|---|---|
| H04N 5/445 | (2011.01) |
| H04N 7/18 | (2006.01) |
| H04N 21/2187 | (2011.01) |
| H04N 21/61 | (2011.01) |
| H04N 5/45 | (2011.01) |

(52) U.S. Cl.
CPC ............ H04N 5/45 (2013.01); H04N 21/2187 (2013.01); H04N 21/6125 (2013.01); H04N 7/185 (2013.01); H04N 5/44591 (2013.01)
USPC .................. 725/41; 725/43; 725/44; 725/48; 725/51; 348/143

(58) Field of Classification Search
USPC ...................... 725/41, 43, 44, 48, 51; 348/143
See application file for complete search history.

(56) References Cited

U.S. PATENT DOCUMENTS

| | | | | |
|---|---|---|---|---|
| 7,272,148 | B2 * | 9/2007 | Zhang et al. .................. | 370/401 |
| 7,778,214 | B2 * | 8/2010 | Sumioka et al. .............. | 370/315 |
| 7,911,497 | B2 * | 3/2011 | Russell et al. ................ | 348/143 |
| 2004/0117831 | A1 * | 6/2004 | Ellis et al. ........................ | 725/53 |
| 2005/0052578 | A1 * | 3/2005 | Phillips et al. ................ | 348/584 |
| 2006/0239592 | A1 * | 10/2006 | Slatter ............................ | 382/305 |
| 2007/0195203 | A1 * | 8/2007 | Walker et al. ................. | 348/725 |
| 2009/0079823 | A1 * | 3/2009 | Bellamy et al. .............. | 348/143 |
| 2010/0174753 | A1 * | 7/2010 | Goranson ..................... | 707/791 |
| 2010/0250765 | A1 * | 9/2010 | Riggert et al. ................ | 709/231 |

* cited by examiner

Primary Examiner — Nathan Flynn
Assistant Examiner — Sumaiya A Chowdhury
(74) Attorney, Agent, or Firm — Squire Patton Boggs (US) LLP

(57) ABSTRACT

Full motion live video can be provided in tactical and other environments utilizing various apparatuses and methods. An apparatus can include live source video inputs configured to receive live source video streams, video outputs configured to provide live output video streams configured according to a channel template design; and a processor configured to control multiplexing of the live source video streams to provide master control of the live source video inputs and video outputs. Another apparatus can include an input configured to receive video streams from the prior apparatus, a processor configured to fuse the video streams, and a user interface configured to present the video streams to the user in multiple independent frames, wherein the multiple independent frames include a relatively larger live video of interest and relatively smaller live thumbnail videos.

18 Claims, 9 Drawing Sheets

MULTIMEDIA CONTENT FUSION

CROSS REFERENCE TO RELATED APPLICATIONS

The present application is related to, and claims the priority of U.S. Provisional Patent Application No. 61/272,584 filed Oct. 8, 2009. The entire content of the provisional application is incorporated herein by reference.

BACKGROUND

1. Field

Embodiments of the present invention relate to technologies for full motion live video in tactical and other environments utilizing various apparatuses and methods.

2. Description of the Related Art

Conventional digital television (TV) channels contain content that has been controlled and aggregated at a central studio to form a composite TV channel that is centrally broadcast as one combined video. The combined video is transmitted to many end-user TV screens, all of which view the same composite TV channel at the same time. Cable providers also transmit/broadcast several video signals (i.e. composite and internet protocol (IP) multicast) to end-users. The former technology is generally one-way and each channel is created at a central studio/location and delivered to all end-users uniformly. This combination of multiple videos/images on the same screens simultaneously, is also known as a mosaic video channel.

There are a number of techniques for presenting multiple video streams on a single personal computer (PC) screen. In one technique, multiple videos are combined into a single combined image which is transmitted to end users as a single image. Several techniques (with variations on the same basic theme) are also available for reducing the bandwidth used to transmit these signals. One such technique employs multiple low resolution thumbnail images, transmitted as a data stream to tell the user what video streams are available for viewing. A focus stream containing a series of high resolution images from a selected source are displayed in a relatively large area on the viewer's screen. A user can switch the "focus" stream by clicking on the associated thumbnail.

These interactive techniques generally employ a tactical viewer for the end user. The tactical viewer may be Internet-browser-based and may be slaved to an Internet web server. These techniques are meant to disseminate only a handful of videos to a similarly small number of end users. In practice, if more than one user simultaneously clicked on several different thumbnails at nearly the same time, or a thumbnail was selected that was different than the current high resolution image being sent in the "focus" stream, an uncontrolled situation would result, in which a user of the receiving group would not be able to independently control which focus video was on their screen.

SUMMARY

According to certain embodiments, an apparatus is provided, which includes live source video inputs of any analog or digital native video source configured to receive live source video streams. The apparatus also includes a processor configured to process the multiple live sources via a multiplex function, to provide master control of inputs and outputs as required. The apparatus also includes video outputs configured to provide live output video streams according to the channel template design.

In other embodiments, an apparatus includes an input configured to receive video streams. The apparatus also includes a processor configured to control the aggregation or simultaneous presentation of the live video streams. The apparatus also can be customized to include a single user interface to present videos in multiple independent frames, selectable via a touchscreen. The multiple independent frames include a relatively larger live video of interest and relatively smaller live thumbnail videos.

A method, according to certain embodiments, includes receiving, by a device, live source video streams. The method also includes processing, by the device, the live source video streams based on the channel template. The method further includes providing, by the device, live output video streams corresponding to the channel template design.

In further embodiments a method includes receiving, by a device, video streams. The method also includes fusing, in the device, the video streams. The method further includes presenting, by the device, the video streams to the user in multiple independent frames. The multiple independent frames include a relatively larger live video of interest and relatively smaller live thumbnail videos.

BRIEF DESCRIPTION OF THE DRAWINGS

For proper understanding of the invention, reference should be made to the accompanying drawings, wherein.

DETAILED DESCRIPTION

Figure 1:
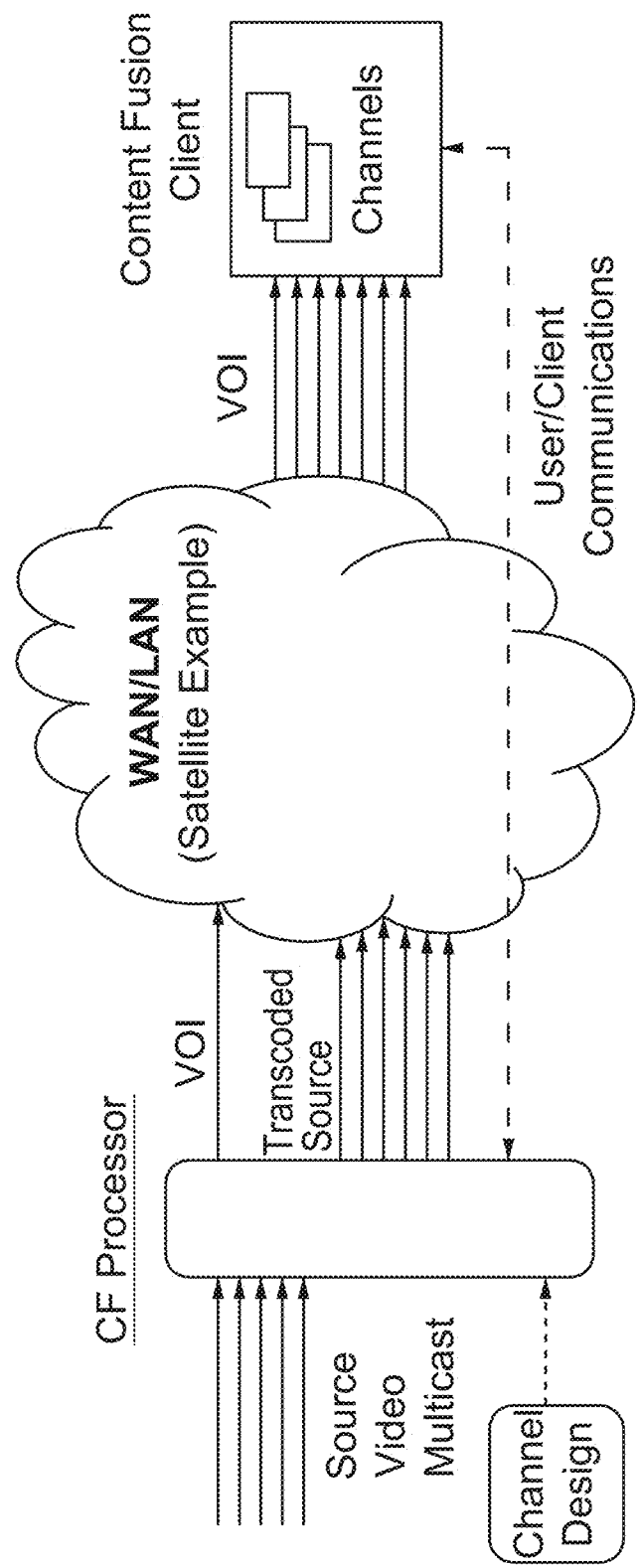
FIG. 1 illustrates a system according to certain embodiments of the present invention.

It will be readily understood that the components of the present invention, as generally described and illustrated in the figures herein, may be arranged and designed in a wide variety of different configurations. Thus, the following more detailed description of the embodiments of a method, apparatus, and system, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, the usage to "certain embodiments," "some embodiments," or other similar language, throughout this specification refers to the fact that a particular feature, structure, or characteristic described in connection with the embodiment may be included in at least one embodiment of the present invention. Thus, appearances of the phrases "in certain embodiments," "in some embodiments," "in other embodiments," or other similar language, throughout this specification do not necessarily all refer to the same group of embodiments, and the described features, structures, or characteristics may be combined in any suitable manner in one or more embodiments.

Motion imagery, also known as full motion video (FMV), can be used in various Command and Control ($C^2$) and Intelligence, Surveillance, and Reconnaissance (ISR) systems to enable senior level Department of Defense (DoD) decision makers to act on coherent and timely data from various sources. Of course, embodiments of the present invention can be applied to any video sourcing.

There are large and growing numbers of platforms that provide motion imagery and image quality generated is of increasingly high quality. Sources for the imagery include, for example, deployed unmanned aerial vehicles (UAVs) and unmanned ground vehicles (UGVs). Other types of unmanned vehicles, such as unmanned water vehicles (UWVs) could also be used in certain combat situations. These unmanned vehicles and unmanned vehicle systems (UVSs) can generate massive amounts of motion imagery data. Currently, 10 TB of motion imagery per month from these platforms is backhauled and disseminated for viewing and exploitation from Iraq and Afghanistan. Meanwhile, wide area surveillance (WAS) platforms capable of providing 10 TB per hour may be implemented. Moreover, there has been an explosion in the growth of video supported military and intelligence, surveillance, and reconnaissance missions as more and more unmanned vehicles are being fielded. The preceding is a focused example of an application of certain embodiments of the present invention. This example, however, in no way implies that the invention is limited to DoD applications only.

These streams may be disseminated by satellite to hundreds of users for situational intelligence and exploitation via relatively low bandwidth communication channels. The current processing, exploitation, and dissemination (PED) systems as deployed, however, are principally focused on capturing, storing, annotating, and viewing the video offline.

These video streams may also contain geospatial metadata. For current DoD systems, where multiple encrypted internet protocol (IP) multicast video streams containing key-length-value (KLV) or cursor on target (COT) metadata are backhauled and retransmitted through a satellite, the remote user is required to know the IP multicast address of each individual stream of interest in order to view that stream on his laptop or other personal computer (PC) display. Even if the remote user knows this address, only one video stream is conventionally displayed on his screen at a time.

FIG. 1 illustrates a system according to certain embodiments of the present invention. Certain embodiments of the present invention provide a new topology and system for disseminating, capturing and displaying, multiple, simultaneous live internet protocol (IP) multicast video and data streams on a single screen. The video and data streams, as well as any other content to be displayed, may have been transported via any wide area network (WAN)/local area network (LAN) including: a two-way wireless network, such as SatCom, WIMax, a broadband cellular data network, or the like; a wired network; or a hybrid network. In certain embodiments, one-way broadcasts of user datagram protocol (UDP)/IP multicast video streams are also supported. The video and data streams can be designed to be presented to tens or hundreds of users. The simultaneous presentation of dynamically selectable, live video and data streams, also known as the fused content, in a user defined channel template on a PC screen to many users may be achieved by certain embodiments of the present invention. Each user may be viewing a different channel template, and thus each user may have an individually defined content fusion.

Using a variety of technologies, including digital signage, certain embodiments of the present invention allow for the dissemination, interactive filtering, and fusion of the following: multiple live motion imagery streams (thumbnails and high resolution), chat data, real time geographic location of vehicles on a map (such as Google™ Maps), and miscellaneous real time data (e.g. chat, weather, secret IP router network (SIPRNET), or the like).

Two components of the system, as shown in FIG. 1, are the content fusion (CF) processor and the content fusion client. The content fusion processor, which may be located at a satellite hub or at a location where the raw video streams can be centralized prior to dissemination. All video streams can be individually converted to thumbnails by transcoding them to a data rate in the range 128 Kbps to 256 Kbps (for example, H.264 format) with key-length-value (KLV) metadata intact, if present. Video streams that have been interactively selected by end-users can also be sent as videos of interest (VOI).

The content fusion client serves the core of a tactical viewer in certain embodiments. The content fusion client can be a modified digital signage player that allows for the fusion of several live motion imagery streams, Rich Site Summary (RSS) formatted content, chat and the simultaneous execution of KLV metadata in a map (such as Google™ Map), on the same screen. The map can track the motion of multiple vehicles as determined by the KLV metadata extracted from the live motion imagery streams.

Certain embodiments of the present invention can leverage a significantly modified player client, as a content fusion client, to provide the user with several live streaming live videos in a tactical viewer with a small software footprint. The software can be easily installed and operated on a user's PC running an operating system such as Microsoft Windows™ XP, Vista™ or Windows 7. The content fusion client can communicate with the content fusion processor to receive channel templates, media playlists, media files, and network authorization. The content fusion client can also communicate user video of interest requests, ACKs for successful file reception, and heartbeats back to the content fusion processor. The heartbeats may permit the content fusion processor to keep track of the content fusion clients that are still active. In certain embodiments where the video dissemination is one-way, the content fusion client does not require communication with the content fusion processor for a limited capability to display multiple live videos.

TV-like channel templates or channels can be pre-designed off-line by the network manager per the channel owner's requirements. A channel in this context is something to be displayed full screen on the user's PC screen. A channel can be defined with various frames (one or multiple) placed in any position on the screen. Each frame can be defined as to what media or executable is to be played in the frame. For example, an MPEG2 or MPEG4 file that has been stored locally could be played in a particular frame. Similarly, a PowerPoint™ slide show could be played in the frame as well as an RSS weather report with graphics.

A content fusion client can contain several channel templates that are selectable by the user using a tactical viewer. The channel template design can be what makes each channel distinct from other channels visually, such as the layout, number of frames, and so forth. The channel templates can be controlled and designed offline by, for example, the channel owner. The channel templates can be stored locally with each content fusion client and can be displayed one at a time in the tactical viewer as selected by the user, as a mechanism by which the content is arranged for presentation. The channel templates can also be disseminated by the content fusion processor. Although the content fusion client can listen and receive the IP video streams based on the channel template design, the content fusion processor can have complete control over the content fusion client's operation and what (and when) it displays.

A digital signage player can be configured to execute flash, scripts such as visual basic scripts, and extensible markup language (XML) objects along with allowing slide show presentations to be displayed on large and small screens. The scripts may be playlists that tell the player which media files to play, in which sequence. The script may also indicate the time of day that the media files should be played, and may also indicate in which frame of the channel the media files should be played.

Figure 2:
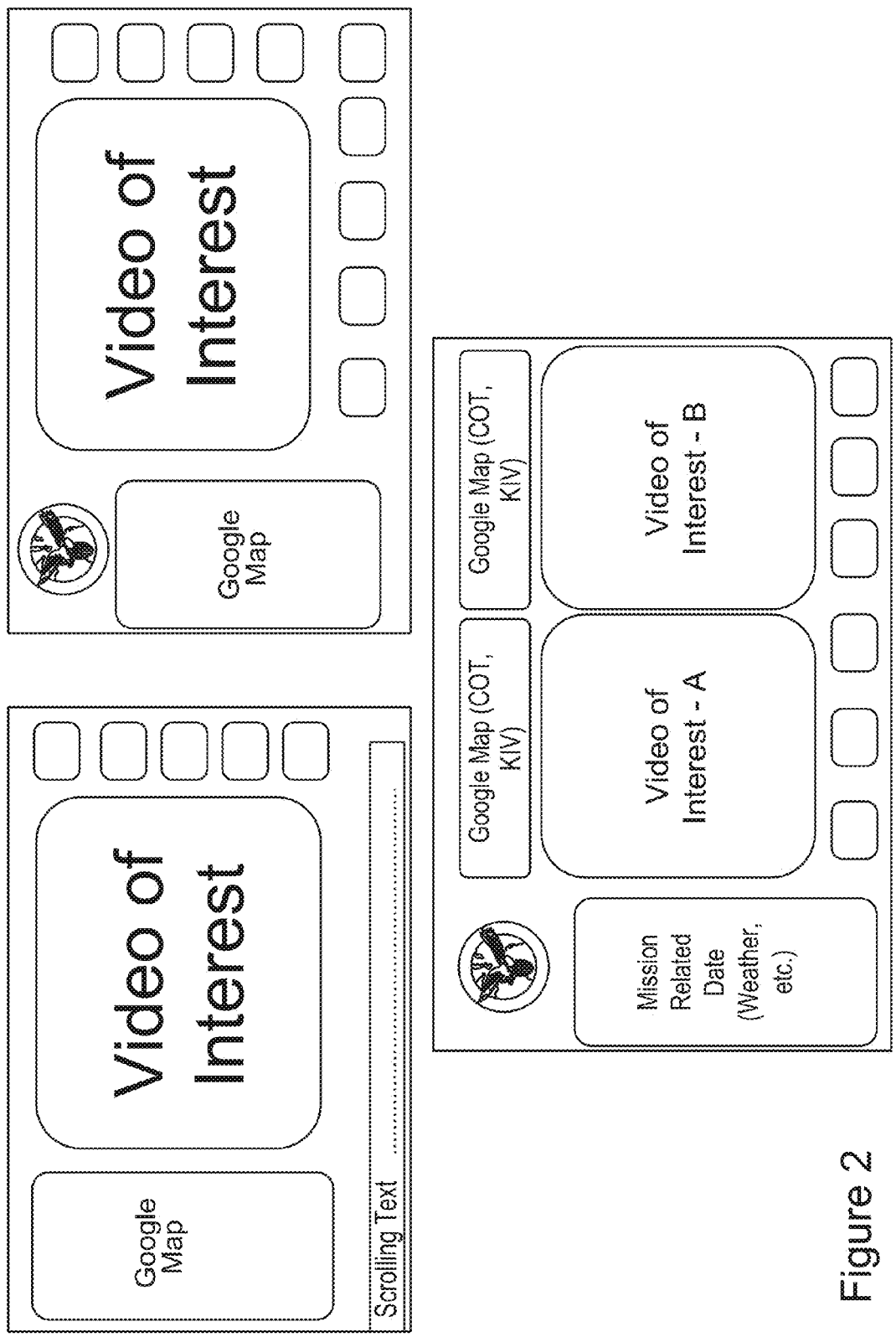
FIG. 2 illustrates several user interfaces according to embodiments of the present invention.

FIG. 2 illustrates several user interfaces according to embodiments of the present invention. The content fusion client may be configured to allow the channel template to decode and display multiple live video IP multicast streams simultaneously in several frames. Additionally, the content fusion client can be configured to allow a third party program (for example, Google™ Maps) to execute simultaneously and be presented on the same screen as the channel. Thus, the fusion of the various data streams onto a single screen can present an integrated real time picture to the user. The content fusion client is designed to be installed on a touch screen PC/Laptop. As seen in FIG. 2, channels (or channel templates) can be designed to allow for various placements of low date rate thumbnails, the high rate video of interest streams, maps, and SIPRNET chat.

From a security perspective, once the content fusion client has been registered with the content fusion processor, the content fusion processor has complete control over the remote content fusion client. Thus, this embodiment offers the ability to remotely control, in real time, all deployed, sub-netted or individual content fusion clients. A specific channel template can be selectively sent to only authorized content fusion clients. Likewise, individual content fusion clients can be de-authorized and removed from the network of authorized content fusion clients as required.

In the content fusion processor (located at the hub in this example), transcoding of the IP multicast streams is optional. If network bandwidth is not an issue, the content fusion processor can be configured to allow all IP multicast streams to be transmitted at their unprocessed rate. As such, the content fusion client could process all video streams at the same rate. It should be noted that processing all video streams at the same rate puts additional demand on the user's computer processor and may impact the ability of the content fusion client to properly display the channel. Also, the display size of an individual video stream may remain the same as the thumbnail version, unless selected as a video of interest, given the constraints of the channel. For satellite and most wireless networks, the total transmitted bandwidth may be minimized by transmitting all video streams as low rate thumbnails and only those video of interest selected streams as high data rate.

Operationally, a channel owner can identify the users in his network that will be authorized to receive the channel and the frames of the channel. For example, a channel for Special Operations Command (SOCOM), as well as the channel's content and design, could be controlled by a designated representative of SOCOM. The channel owner also controls who has permission to select the videos of interest in the SOCOM channel.

Once an authorized user, such as the designated representative of SOCOM in this instance, selects a thumbnail to designate as the video of interest, the channel background color (behind and around the frames) changes to a separate blinking color (red is one suitable color) for a period of time, such as about three seconds, prior to the change. This change of color and/or blinking of the background can notify all users on that channel that one or all of the videos of interest is about to change.

Alternately, a video of interest can be selected by the user selecting the corresponding vehicle designator in the interactive map. Local area maps can be preloaded/pre-stored in the user's computer prior to using the content fusion client. Depending on the resolution chosen in the map while in the channel, multiple vehicles operating in the immediate vicinity may be displayed geographically on the map. Selecting one of these vehicles interactively on the map can cause that particular vehicle's video to be streamed as a video of interest.

As can be seen in FIG. 2, the number of videos of interest does not have to be limited to one. Additionally, thumbnail videos can be positioned on one side, the side and the bottom, or only the bottom of the interface. Additionally, while a map may be provided on the left hand side of the interface, alternatively a map can be provided above each video of interest, and mission related data, such as weather data, can be provided in a panel on the left of the interface. A static image can identify a channel currently being viewed. This may be helpful if the user has more than one channel to potentially monitor. Furthermore, a ticker of scrolling text can be provided along the bottom of the interface.

Figure 3:
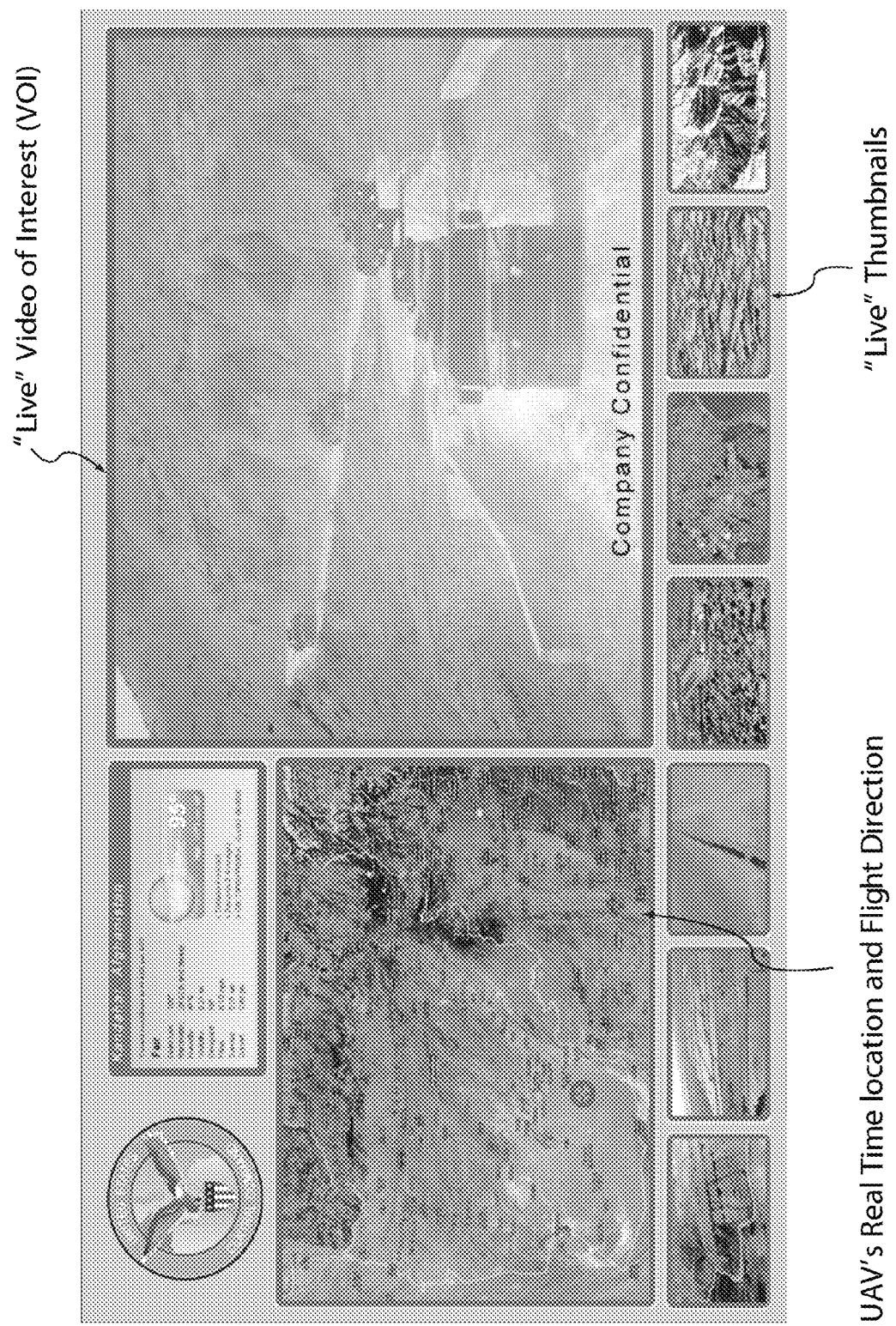
FIG. 3 illustrates a user interface according to embodiments of the present invention.
Figure 4:
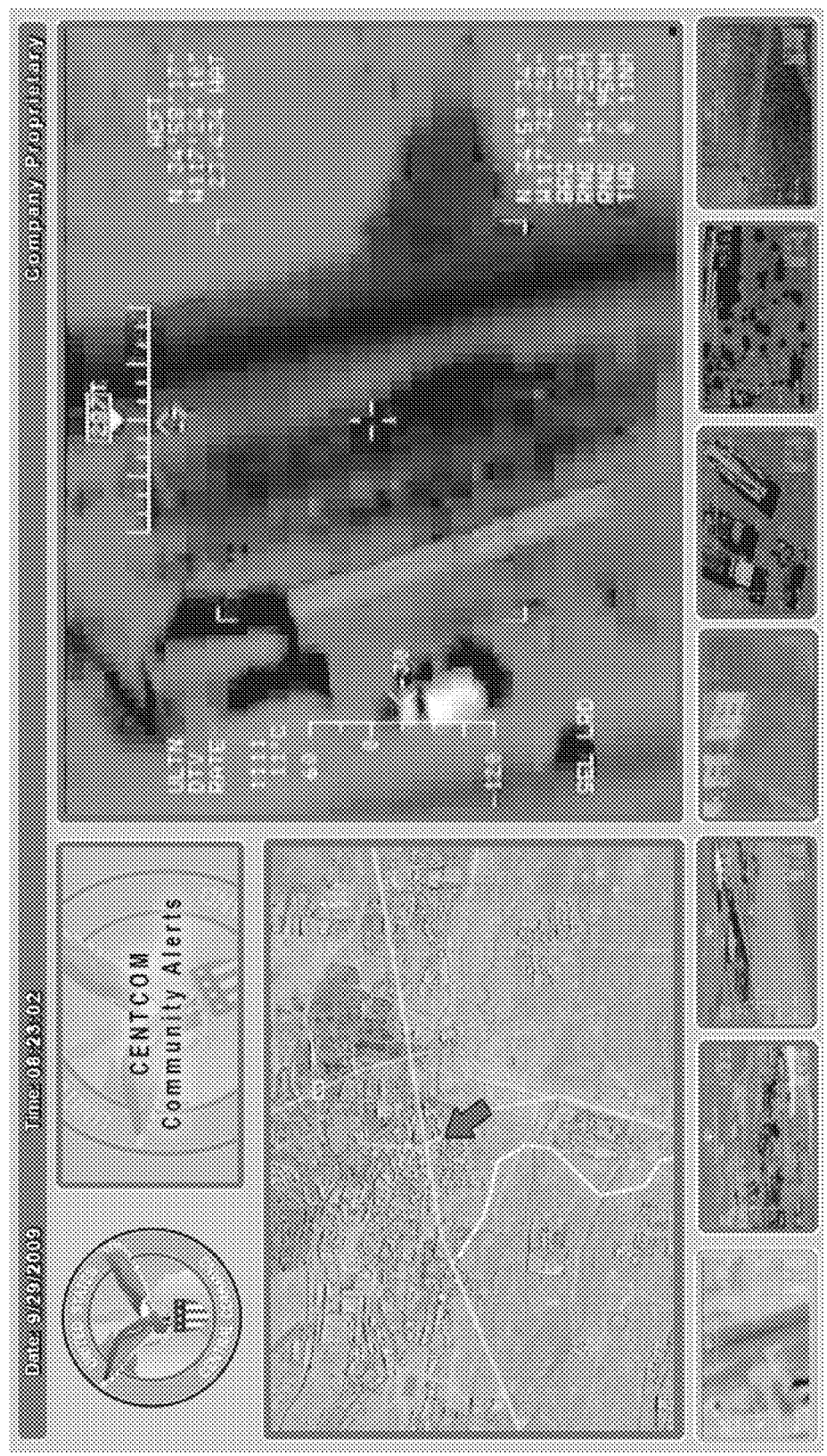
FIG. 4 illustrates a user interface according to alternative embodiments of the present invention.

FIGS. 3 and 4 each illustrate a respective user interface according to embodiments of the present invention. As can be seen in FIGS. 3 and 4, the live thumbnails at the bottom of the screen can be used for real time situational awareness. Users can make quick decisions based on the total fused information presented on the screen.

As shown in FIG. 3, the user interface can include one frame that has a live video of interest on the right hand side, seven live thumbnail videos along the bottom, and a map tracking vehicles that provide images on the left hand side. Additionally, in the left corner there may be a static image designating a channel, and to the right of the static image, live weather information may be provided.

FIG. 4 similarly illustrates a user interface. The user interface in FIG. 4 may include a live video of interest, multiple thumbnail videos, and a map tracking vehicles whose live images appear in the thumbnails. The user interface may also include a static image and a panel for real-time alerts.

Figure 5:
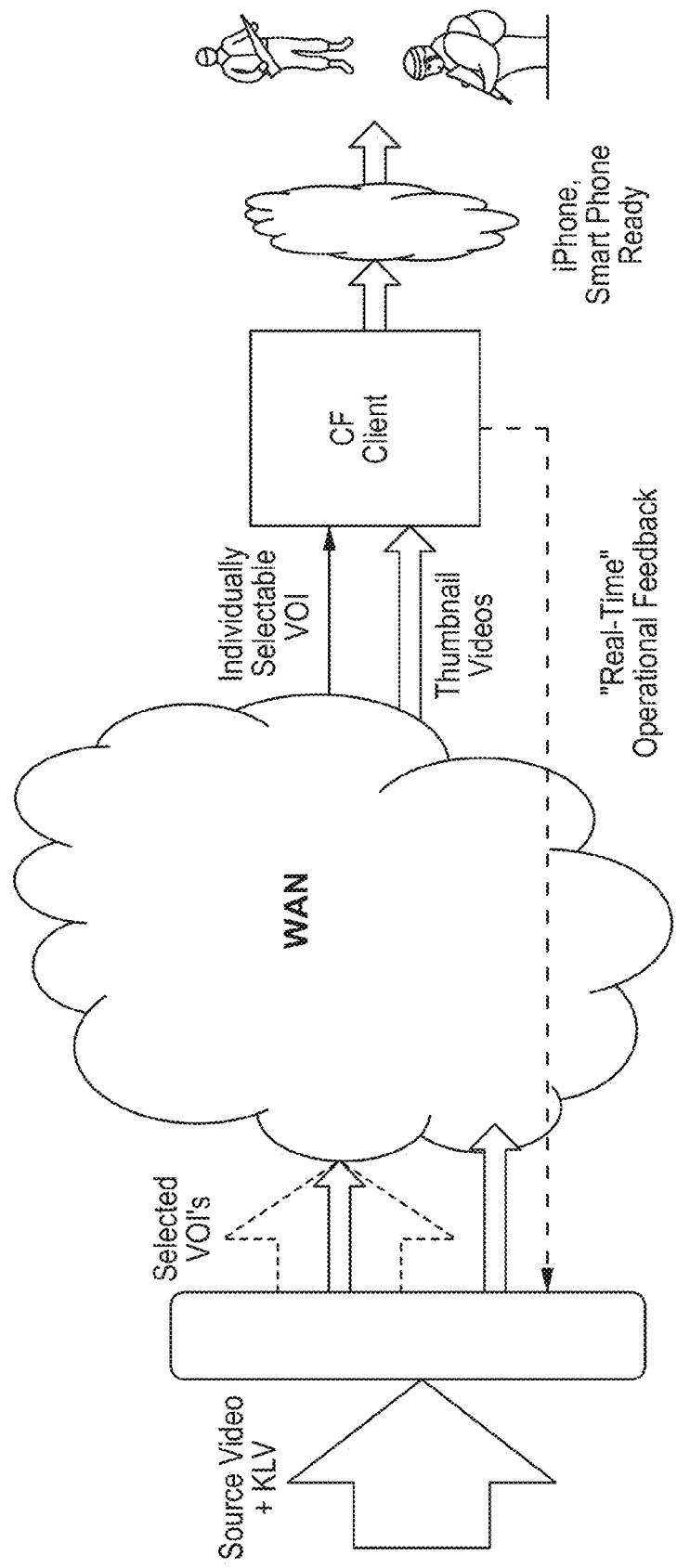
FIG. 5 illustrates a system according to alternative embodiments of the present invention.

FIG. 5 illustrates a system according to alternative embodiments of the present invention. As can be seen in FIG. 5, the transcoded thumbnail streams can be further streamed to hand held smart phones or iPhones™. The content fusion processor at the satellite uplink can be configured to transcode the thumbnails to be compatible with the phone that will receive them.

Note that in the embodiment illustrated in FIG. 5, the content fusion client may not be collocated with the user's display device. Thus, for example, the content fusion client may be located logically between a satellite downlink and a regional mobile phone network and distant from the end-user. It should also be noted that there may more than one kind of user of the system. The end user, a soldier in the field, may be one kind of user. Other users, however, may include regional commanders or even such organizations as the National Military Command Center (NMCC).

Figure 6:
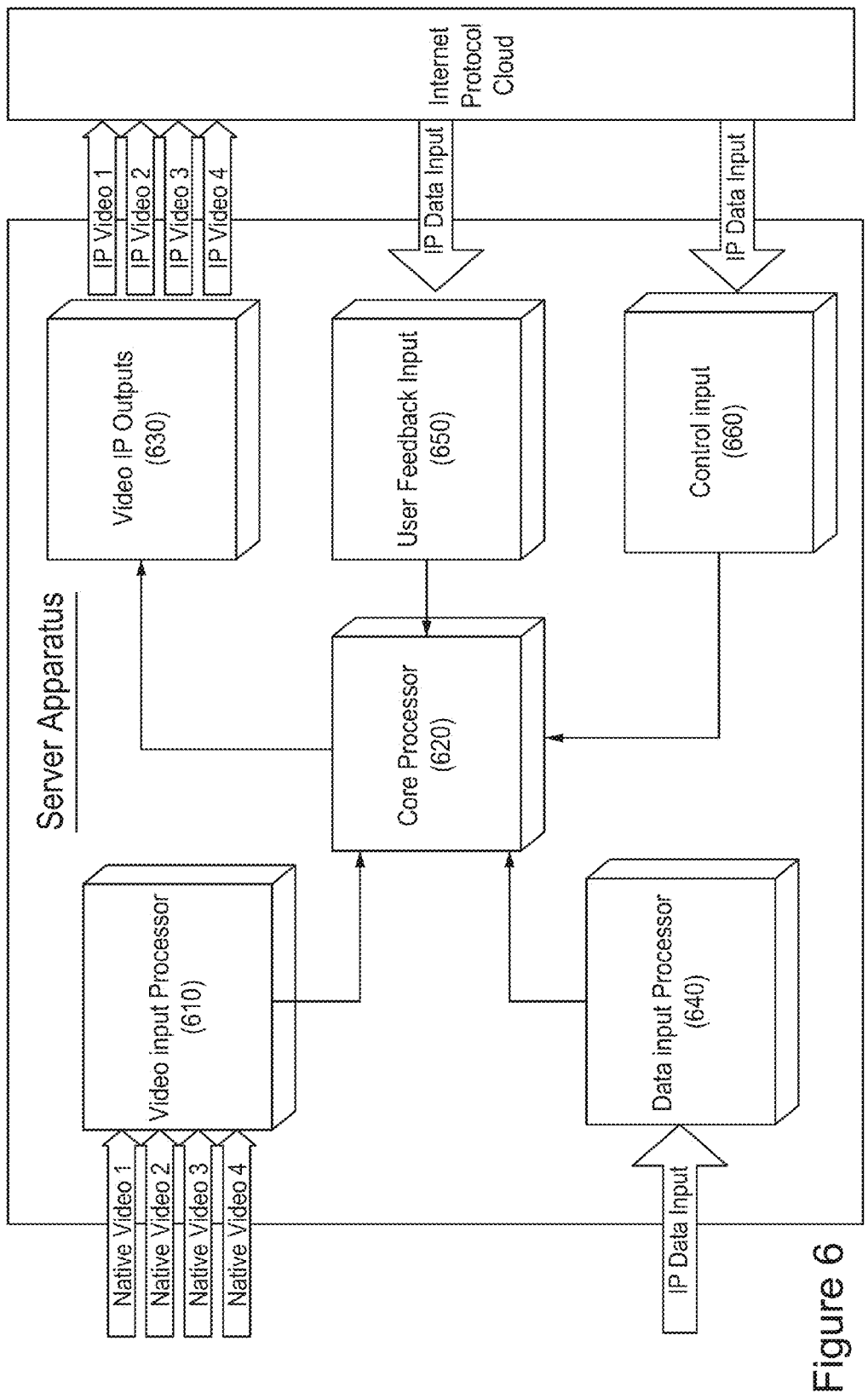
FIG. 6 illustrates a server apparatus according to certain embodiments of the present invention.

FIG. 6 illustrates a server apparatus according to certain embodiments of the content fusion processor of the present invention. The apparatus includes video inputs 610, for example, live source video inputs, configured to receive a plurality of live source video streams. The live source video streams can be multicast streams.

The apparatus also includes a processor 620 configured to process the live source video streams based on a channel design and user interactive feedback. The channel design can specify the number of videos of interest to be displayed, the number of thumbnail videos to be displayed, the number of maps (if any) to displayed, and other data (such as static images, scrolling text, weather alerts, or chats) to be displayed. The channel design can also indicate which video streams should be sent at maximum bit rate and which video streams should be sent at a reduced bit rate. The channel design can further provide layout information for the display of the information by an end-user.

The core processor or controller or processor 620 can be configured to transcode/transrate the live source video streams to provide the live output video streams. Fusion takes place at the content fusion client in various forms, in certain embodiments. For example, the fusion can include the simultaneous presentation of multiple streams with overlayed data. Thus, the processor 620 can be configured to disseminate the live source video streams and at least one data stream to provide the live output video streams.

The processor 620 can be configured to provide a first video stream of the live source video streams as a high quality live output video stream, and a plurality of second video streams as low quality live output video streams. Alternatively, the processor 620 can be configured to convert all of the live source video streams into low quality live output video streams, in addition to providing at least one high quality live output video stream. The processor 620 can be configured to transcode a plurality of the input streams to a data rate within a range of 128 Kbps to 256 Kbps. These transcoded streams may be examples of the "low quality" live output video stream, while the a "high quality" live output stream may have the full bit rate of the original source data. The processor 620 can be configured to preserve key-length-value metadata from the live source video streams to the live output video streams. Alternatively, the processor 620 can be configured to add geographic location tagging to the live source video streams, if additional geographic location information is known to the processor 620. The channel template design can be configured on a per-user basis, according to user preferences. Alternatively, the channel template design can be configured to be the same for all users. Various channel templates can be dynamically selectable. For example, a channel template can be dynamically selected from a plurality of preconfigured options.

The apparatus can further include video outputs 630 configured to provide a plurality of live output video streams configured according to the channel design. Likewise, the apparatus can further include a data input 640 configured to receive at least one data stream of chat data, real-time geographic location of unmanned vehicles, weather data, or data of the secret internet protocol router network. Moreover, the apparatus can additionally include a user feedback input 650 configured to receive communication from a user regarding the live output video streams. The user may be a remote user, and consequently these communications may include such information as acknowledgments and heartbeat communications. The apparatus can also include a control input 660 configured to receive user commands regarding the live output video streams.

The processor 620 can be configured to control multiplexing of the live source video streams to provide master control of the live source video inputs and video outputs. Thus, the processor 620 can include a multiplexing function that operates to handle multiple inputs and multiple outputs as required.

The apparatus of FIG. 6 can be variously implemented. For example, the apparatus of FIG. 6 can be implemented as a rack-mounted computer server, or as a cluster of computing devices. The apparatus may be co-located with a satellite uplink facility. The apparatus may be composed of a single computer chip or multiple computer chips operating together. The apparatus may employ software, such as computer instructions encoded on a computer-readable medium. A computer-readable medium can include a non-transitory medium, such as a computer-readable storage medium.

Figure 7:
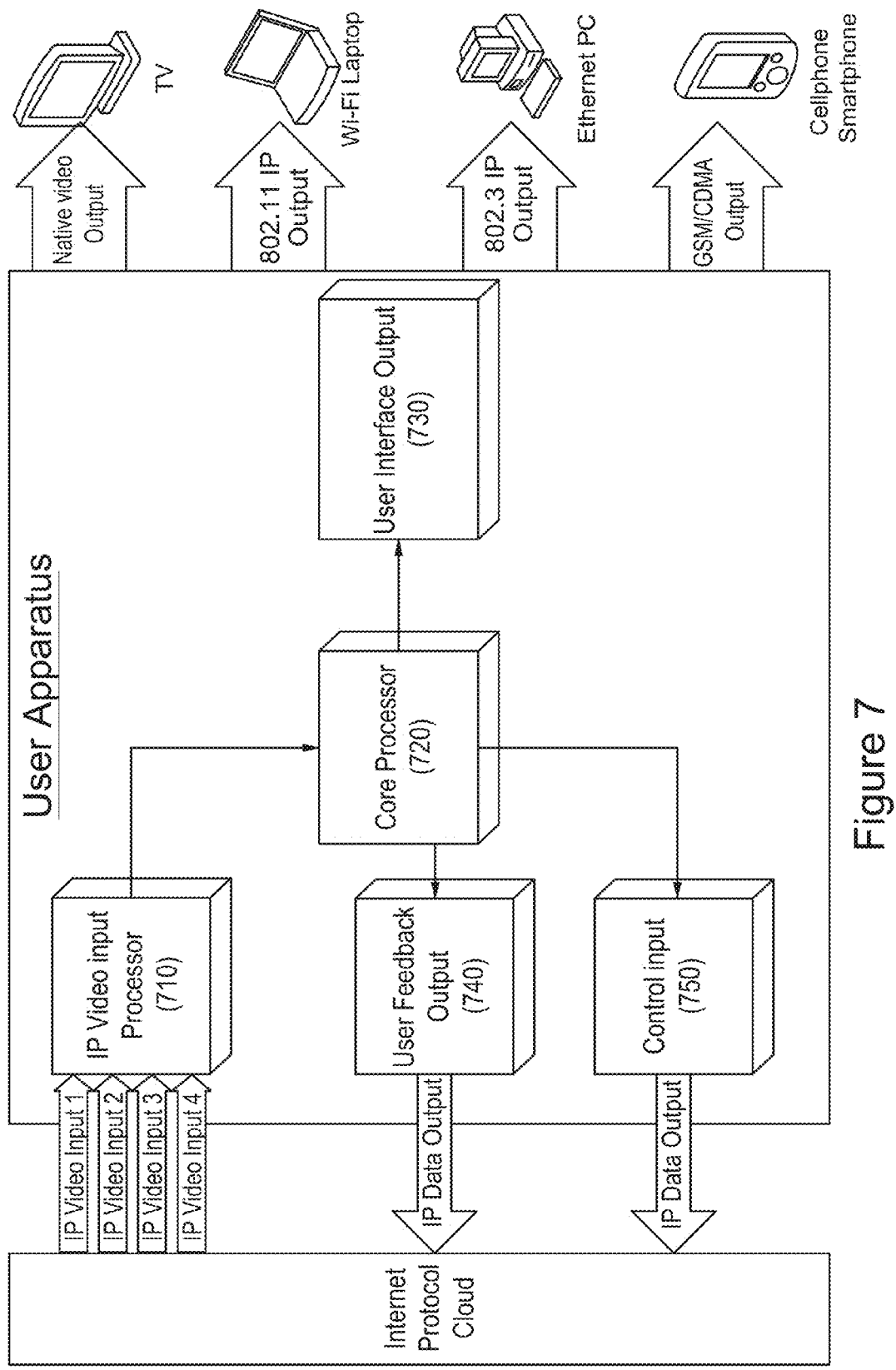
FIG. 7 illustrates a user apparatus according to certain embodiments of the present invention.

FIG. 7 illustrates a user apparatus according to alternative embodiments of the present invention. The apparatus includes an input 710 configured to receive a plurality of video streams. The apparatus also includes a processor 720 configured to fuse the plurality of video streams. More specifically, the processor 720 can be configured to control the aggregation or simultaneous presentation of the live video streams The apparatus further includes a user interface 730 configured to present the plurality of video streams to the user in multiple independent frames. The multiple independent frames include a relatively larger live video of interest and relatively smaller live thumbnail videos.

The user interface 730 can be configured to permit selection of a new video of interest from among the live thumbnail videos. The user interface 730 can be configured to provide a map showing locations of sources of the video of interest and the thumbnail videos.

The apparatus can further include a feedback output 740 configured to provide a heartbeat message to a live source of the plurality of video streams. The apparatus can additionally includes a control output 750 configured to control the plurality of video streams. The control output 750 can be configured to control the plurality of streams using a channel template.

Figure 8:
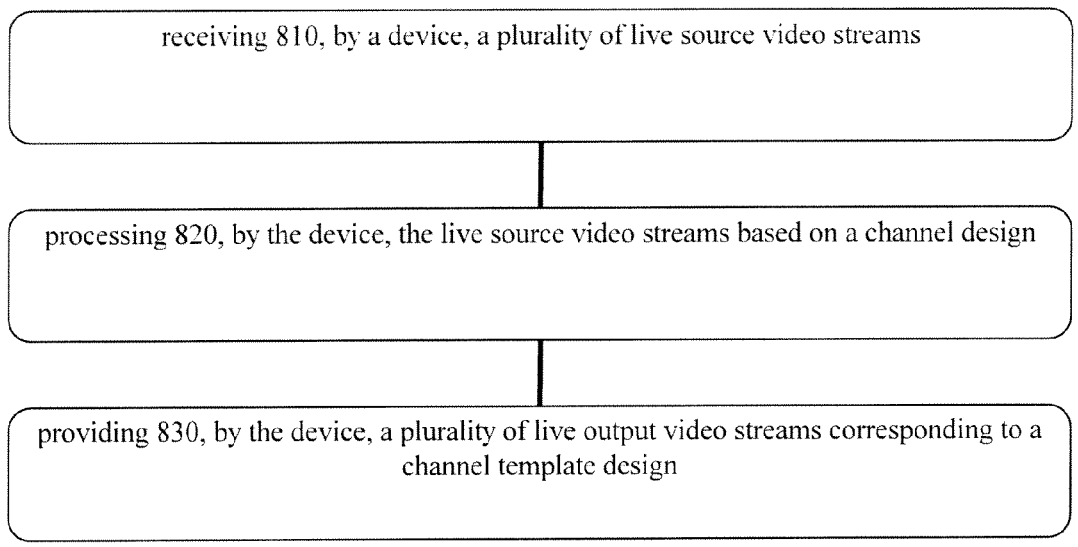
FIG. 8 illustrates a method according to certain embodiments of the present invention.

FIG. 8 illustrates a method according to certain embodiments of the present invention. The method, as illustrated in FIG. 8, includes receiving 810, by a device, a plurality of live source video streams. The method also includes processing 820, by the device, the live source video streams based on a channel design. The method further includes providing 830, by the device, a plurality of live output video streams corresponding to the channel design.

Figure 9:
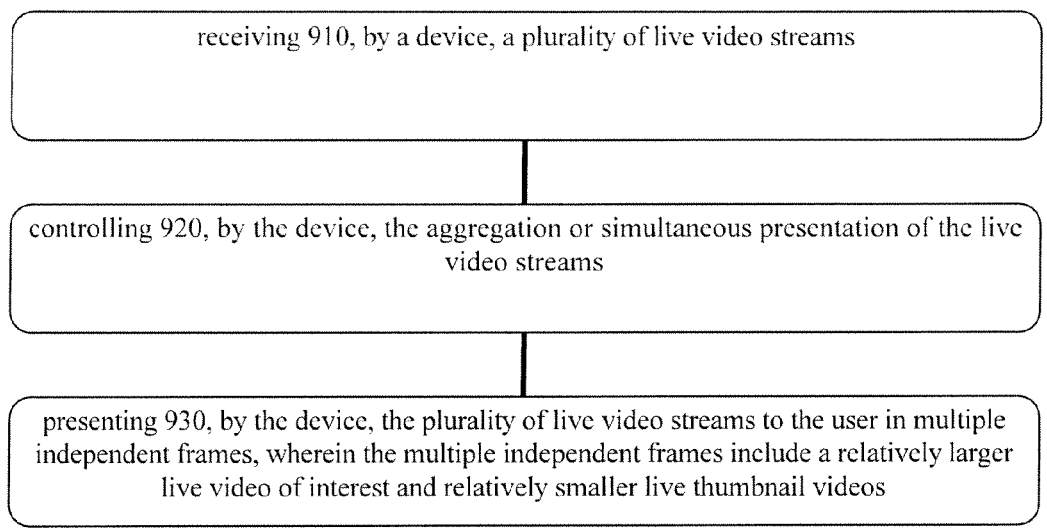
FIG. 9 illustrates a method according to alternative embodiments of the present invention.

FIG. 9 illustrates a method according to alternative embodiments of the present invention. The method includes receiving 910, by a device, a plurality of video streams. The method also includes controlling 920, by the device, the aggregation or simultaneous presentation of the live video streams. The method further includes presenting 930, by the device, the plurality of video streams to the user in multiple independent frames. The multiple independent frames include a relatively larger live video of interest and relatively smaller live thumbnail videos.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

We claim:

1. An apparatus, comprising:
live source video inputs configured to receive live source video streams;
video outputs configured to provide live output video streams to a receiver at a remote client, the live output video streams configured according to a channel template design;
a processor configured to control multiplexing of the live source video streams to provide master control of the live source video inputs and video outputs; and
a control input configured to receive user commands from the remote client regarding the live output video streams,
wherein the processor is further configured to transcode at least some of the live source video streams into low data rate live output video streams, and key-length-value metadata of the live source video streams is preserved during the transcoding, and
wherein the video outputs are further configured to provide the low data rate live output video streams and a high data rate live output video stream to the receiver at the remote client,
wherein the processor is configured to be responsive to a user request command of the user commands provided in a signal sent from a transmitter of the remote client, the user request command comprises a selection of at least one of the live output video streams as a video of interest, and the processor is configured to change only the video of interest from a transcoded low data rate live output video stream to a high data rate live output video stream, and the unselected live output video streams are transcoded low data rate live output video streams.

2. The apparatus of claim 1, wherein the live source video streams are multicast streams.

3. The apparatus of claim 1, wherein the processor is configured to combine the live source video streams to provide the live output video streams.

4. The apparatus of claim 1, wherein the processor is configured to transcode the live source video streams to a data rate within a range of 128 Kbps to 256 Kbps.

5. The apparatus of claim 1, further comprising:
a data input configured to receive a data stream of chat data, real-time geographic location of unmanned vehicles, weather data, or data of the secret internet protocol router network.

6. The apparatus of claim 5, wherein the processor is configured to disseminate the live source video streams and the data stream to provide the live output video streams.

7. The apparatus of claim 1, wherein the channel template design is configured on a per-user basis, according to user preferences.

8. The apparatus of claim 1, further comprising:
a user feedback input configured to receive communication from the receiver at the remote client regarding the live output video streams.

9. The apparatus of claim 1, wherein the channel template design is dynamically selectable.

10. The apparatus of claim 1, wherein the apparatus is connected to the receiver at the remote client via a satellite link or a wireless network.

11. An apparatus, comprising:
an input configured to receive live video streams from a remote live video source, the live video streams comprising low data rate live video streams and a high data rate live video stream, in the low live video streams are live source video streams that have been transcoded, and key-length-value metadata of the live source video streams is preserved during the transcoding;
a processor configured to control aggregation or simultaneous presentation of the live video streams;
a control output configured to control the live video streams, wherein the control output is configured to send a signal to the remote live video source, wherein the signal is based on a user request command, the user request command comprises a selection of at least one of the live video streams as a video of interest, the signal is configured to select only the video of interest to be streamed at a high data rate, and the other live video streams are streamed at a transcoded low data rate to the apparatus from the remote live video source; and
a user interface configured to present the live video streams from the remote live video source to a user in multiple independent frames,
wherein the multiple independent frames include:
the relatively larger live video of interest presented based on the high data rate live video stream from the remote live video source; and
relatively smaller live thumbnail videos presented based on the low data rate live video streams from the remote live video source.

12. The apparatus of claim 11, further comprising:
a feedback output configured to provide a heartbeat message to the remote live video source.

13. The apparatus of claim 11, wherein the control output is configured to control the live video streams using a channel template.

14. The apparatus of claim 11, wherein the user interface is configured to permit selection of a new video of interest from among the live thumbnail videos.

15. The apparatus of claim 11, wherein the user interface is configured to provide a map showing locations of sources of the live video of interest and the live thumbnail videos.

16. The apparatus of claim 11, wherein the apparatus is connected to the remote live video source via a satellite link or a wireless network.

17. A method, comprising:
receiving, by a device, live source video streams;
processing, by the device, the live source video streams based on a channel design, the processing comprising transcoding at least some of the live source video streams into low data rate live output video streams, and key-length-value metadata of the live source video streams is preserved during the transcoding;
providing, by the device, the low data rate live output video streams and a high quality live output video stream to a receiver at a remote client, the live output video streams configured according to a channel template design;
receiving user commands from the remote client regarding the live output video streams; and
changing which of the live output video streams are low data rate live output video streams and which of the live output video streams are high data rate live output video streams, wherein the changing is responsive to a user request command of the user commands provided in a signal sent from a transmitter of the remote client, the user request command comprises a selection of at least one of the live output video streams as a video of interest, and the changing comprises changing only the video of interest from a transcoded low data rate live output video stream to a high data rate live output video stream, and the unselected live output video streams are transcoded low data rate live output video streams.

18. A method, comprising:
- receiving, by a device, live video streams from a remote live video source, the live video streams comprising low data rate live video streams and a high data rate live video stream, wherein the low data rate live video streams are live source video streams that have been transcoded, and key-length-value metadata of the live source video streams is preserved during the transcoding;
- controlling, by the device, the live video streams by sending a signal as a control output to the remote live video source, wherein the signal is based on a user request command, the user request command comprises a selection of at least one of the live video streams as a video of interest, the signal is configured to select only the video of interest to be streamed at a high data rate, and the unselected live video streams are streamed at a transcoded low data rate from the remote live video source;
- controlling, by the device, aggregation or simultaneous presentation of the live video streams; and
- presenting, by the device, the live video streams to a user in multiple independent frames,
- wherein the multiple independent frames include:
- a relatively larger live video of interest presented based on the high data rate video stream from the remote live video source; and
- relatively smaller live thumbnail videos presented based on the low data rate video streams from the remote live video source.

\* \* \* \* \*